Sept. 10, 1946.  G. G. SCOTT  2,407,580
LONG PERIOD PENDULUM
Filed Feb. 15, 1945

Inventor
Gifford G. Scott
By Blackmore, Spencer & Fleet
Attorneys

Patented Sept. 10, 1946

2,407,580

UNITED STATES PATENT OFFICE 2,407,580

LONG PERIOD PENDULUM

Gifford G. Scott, Detroit, Mich., assignor to General Motors Corporation, Detroit, Mich., a corporation of Delaware Application February 15, 1945, Serial No. 578,025

3 Claims. (Cl. 250—41.5)

This invention relates to stabilizing means and more particularly to control means for maintaining supports for certain apparatus in a level position. It is often desirable when using certain measuring or testing or control equipment which is in turn mounted upon mobile vehicles to maintain the equipment in as level as a position as possible to avoid errors which may be introduced into the operation of the system due to tipping, tilting, etc. In order to provide such a stabilization or level maintenance it is, of course, necessary to have some means actuated by rolling or pitching to control leveling means and which in turn will have a long period and not be subject to short rapid fluctuations which would tend to too readily actuate corrective measures.

It is therefore an object of my invention to provide a long period gravity actuated control.

It is a further object of my invention to provide stabilizing or leveling means for maintaining equipment in a predetermined position in which the restoring force of the suspension is small compared to the gravitational force due to unbalance.

It is a still further object of my invention to provide an immersed fly wheel acting as a long period pendulum to control stabilizing or leveling means.

With these and other objects in view which will become apparent as the specification proceeds, my invention will be best understood by reference to the following specification and claims and the illustrations in the accompanying drawing, in which:

Figure 1:
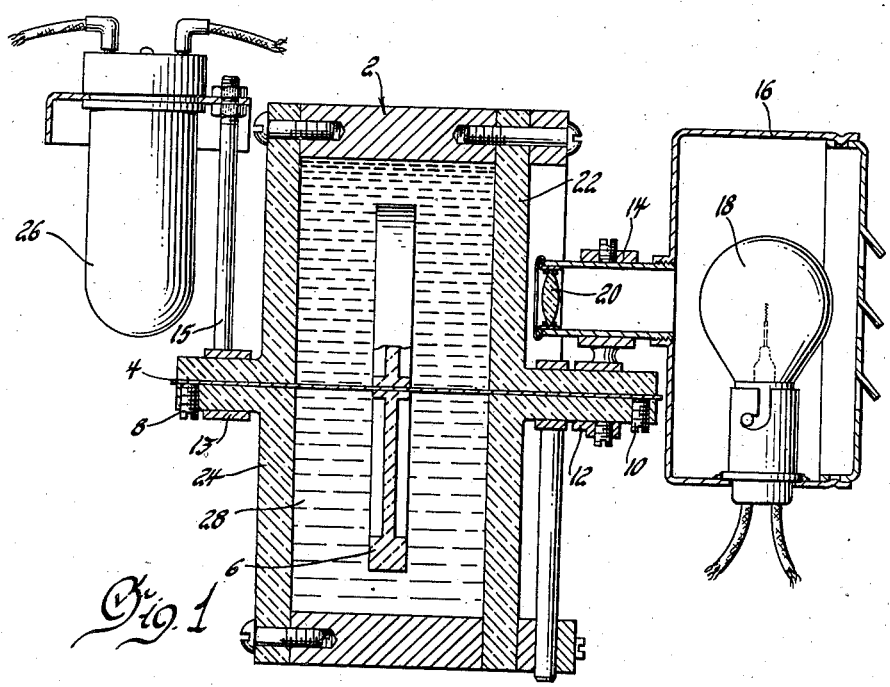
Figure 1 is a vertical section taken through the control means of my invention.

Referring now more specifically to the drawing, there is shown therein a housing 2 having a cylindrical portion and transparent side panels within which there is pivotally mounted on a ribbon 4 a transparent or Lucite fly wheel 6, one portion of the fly wheel being slightly weighted so that it tends to remain in a given rotative position upon its axis. The ends of the ribbon are clamped in the sides of the housing by suitable retaining set screws 8 and 10. A yoke 11 has formed on one end bushing 12 which supports an arm 14 carrying a housing 16 in which a source of light 18 is mounted. One side of the housing and that portion actually supported by the bracket 14 is a small cylindrical tube carrying a concentrating lens 20 at its outer extremity directing light through the transparent sides 22 and 24 of the housing 2 and through a portion of the Lucite fly wheel 6.

Figure 2:
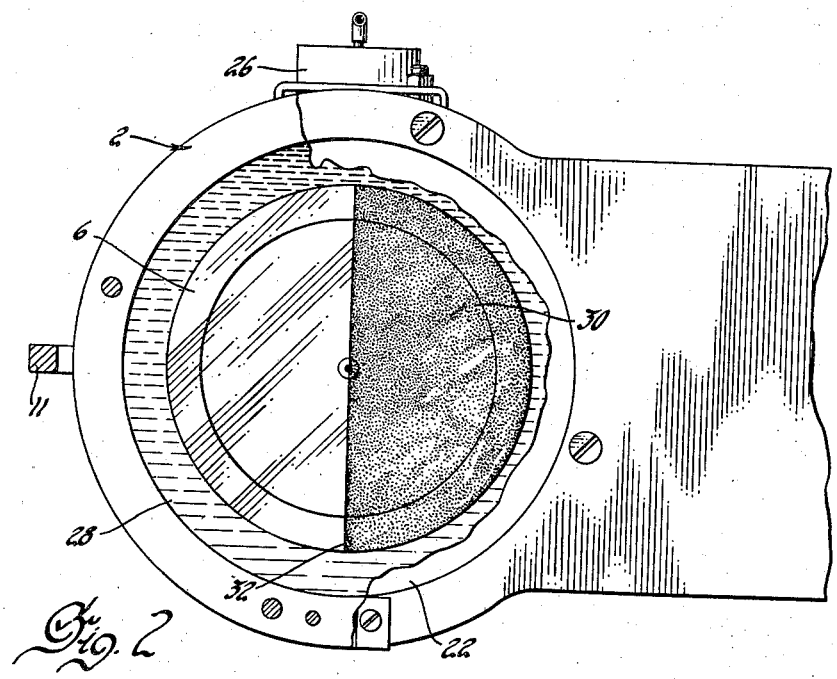
Figure 2 is a side elevation of my control pendulum, parts being broken away and shown in section.

On the opposite end of yoke 11 and on the opposite side of the housing 2 is a second bushing 13 carrying arm 15 upon which a photo-electric or sensitized cell 26 is mounted to be affected by light shining from the source through the fly wheel. The housing is likewise filled with a liquid 28 having about the same specific gravity as the material of the fly wheel, for example, Lucite to assist in supporting the same. The wheel itself is painted with an opaque paint over one half of its area as shown at 30 in Figure 2 so that light can freely pass through half of the fly wheel but not the other half. Thus, as the fly wheel rotates about its axis, if the dividing line 32 is so positioned as to intercept the beam of light thrown from the source of light 18 to the photo cell 26, any rotation would either cut off the flow of light or in the inverse direction permit flow of the same, thus applying a series of pulses or energized periods to the photo cell.

It is intended that the mechanism be mounted upon the part to be leveled and should control, through the photo cell, the driving means for moving the platform or support to its new position, the actual movement of the same therefore acting as a follow-up means to return the fly wheel to its original or neutral position. The use of the ribbon support for the fly wheel is to provide a support giving practically no static friction and very small restoring forces as compared to the gravitational force on the unbalance of the fly wheel, and by using liquid of approximately the same specific gravity as the fly wheel most of the force tending to sag the suspension will be removed and there will be obtained a proper amount of friction to obtain critical damping. The actual gravitational force is relatively small and since the fly wheel is damped the period of the same is long and I obtain in effect a long period pendulum action.

It will thus be obvious that by mounting the construction as shown upon a platform to be maintained in a substantially level position that any tendency of the same to move to a new position will cause the fly wheel to tend to rotate either cutting off or permitting the flow of light to the photo cell which in turn would control a driving motor (not shown) to return the platform to its original level position. It will, of course, be also obvious that the mechanism must be adjusted initially so that the beam of light falls upon the intersecting line 32 before the apparatus is put in operation, and for this purpose the yoke supporting the housing of the source of light 18 and the cell is adjustable around the axis or ribbon 4 to provide the correct initial index.

I claim:

1. In stabilizing means, a source of light, a light sensitive cell, a light intercepting pendulum pivotally mounted between the source and cell and transparent damping means in which the intercepting pendulum is immersed having approximately the same specific gravity as the material of the light intercepting pendulum.

2. In stabilizing means, a casing having transparent walls, an unbalanced wheel formed of transparent material, an opaque coating on a portion of said wheel, a thin ribbon suspension for said wheel in said casing, damping means in said casing immersing said wheel, a source of light and a photo sensitive cell mounted on opposite sides of said casing so that the light from the source to the cell passes through the casing and a section of the wheel and the wheel area controls the flow.

3. In stabilizing means, a casing having transparent walls, an unbalanced wheel of transparent material mounted in a vertical plane forming a pendulum means, an opaque coating over substantially one-half of said wheel, a thin ribbon suspension for said wheel in said casing, damping means in said casing immersing said wheel, a source of light and a photo sensitive cell mounted on opposite sides of said casing so that the light from the source to the cell passes through the casing and a section of the wheel and the wheel area controls the flow.

GIFFORD G. SCOTT.